United States Patent Office 2,776,175
Patented Jan. 1, 1957

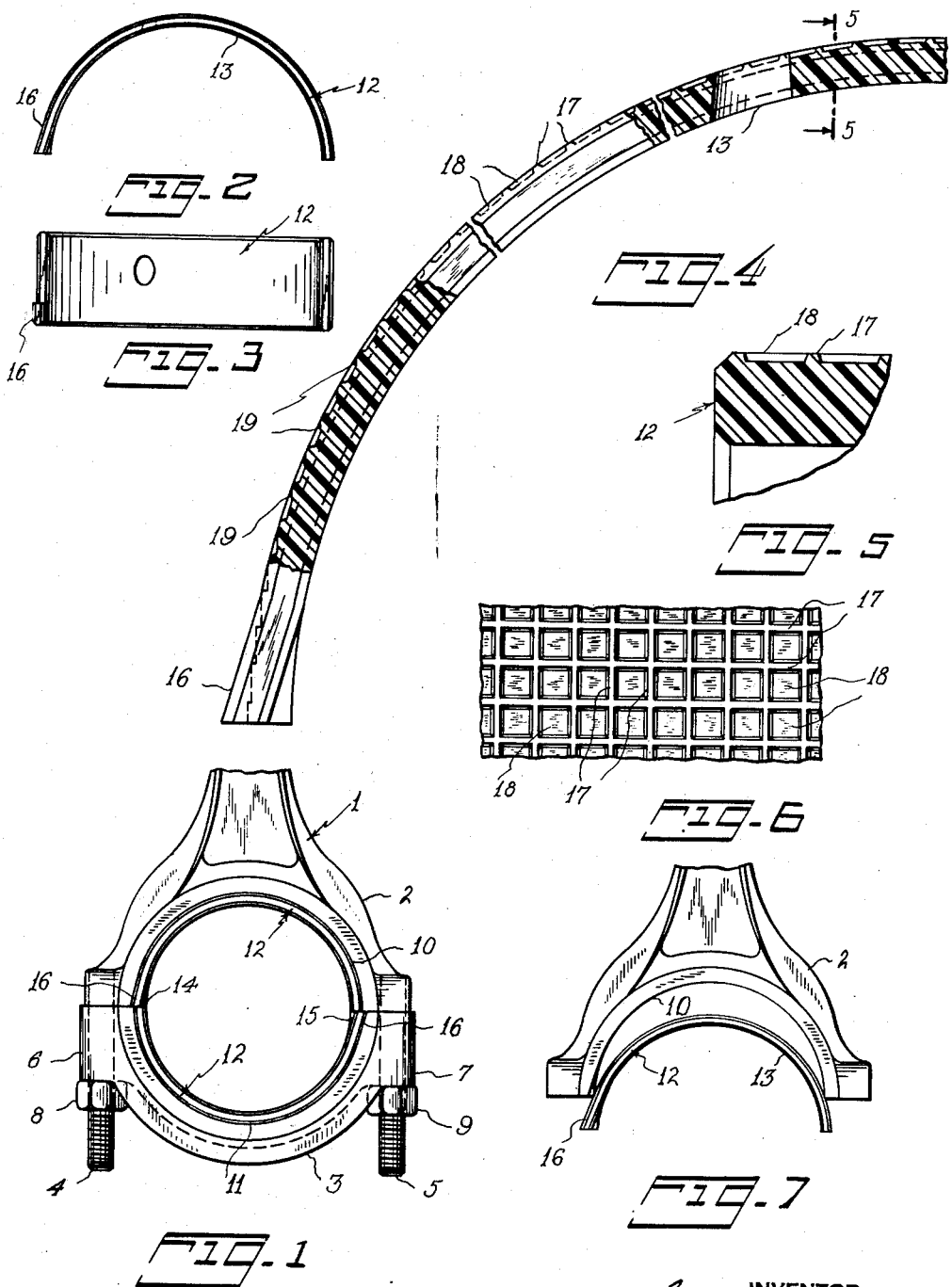

2,776,175

NYLON LINER FOR CONNECTING ROD BEARINGS

George F. Waite, Pelham, N. Y., assignor to Curtiss-Wright Corporation, a corporation of Delaware Application December 28, 1953, Serial No. 400,599

5 Claims. (Cl. 308—238)

My invention relates to bearings and has particular reference to connecting rod bearings for co-acting with the engine crank shaft of a motor vehicle or the like.

It is a principal object of my invention to provide an improved connecting rod bearing which can be fabricated without the necessity of carefully fitting babbitt liners in place or performing extensive and time-consuming finishing operations on the bearing.

It is another object of my invention to provide a novel and improved connecting rod bearing having a plastic liner which is fitted against an unfinished surface in the bearing and is formed with cavitations in its outer surface adjacent to said unfinished surface permitting roughness or unevenness in the unfinished surface to become embedded in the liner when the liner is in a semi-fluid condition without squeezing liner material out of the bearing.

The invention will be more fully set forth in the following description referring to the accompanying drawings and the features of novelty will be pointed out with particularity in the claims annexed to and forming a part of this specification.

Referring to the drawings:

Fig. 1 is an end elevational view of a connecting rod bearing fitted with plastic liner sections constructed in accordance with my invention.

Fig. 2 is an end elevational view of one liner section.

Fig. 3 is a top plan view of the liner section shown in Fig. 2.

Fig. 4 is an enlarged fragmentary end elevational view of the plastic liner of Figs. 2 and 3, with portions thereof shown in section.

Fig. 5 is a sectional view taken on the plane of line 5—5 of Fig. 4.

Fig. 6 is an enlarged plan view of a portion of the outer surface of the liner section showing cavitations formed therein.

Fig. 7 is an end elevational view of the plastic liner section in position for insertion into a connecting rod bearing section.

In the drawings reference character 1 designates a portion of a connecting rod for an internal combustion engine including the bearing sections 2 and 3 which are adapted to connect to an engine crank shaft. Secured to bearing section 2 are a pair of studs 4 and 5 which extend vertically with the connecting rod in an upright position. Such studs 4 and 5 extend through projections 6 and 7 on bearing section 3 to connect bearing sections 2 and 3, and have nuts 8 and 9 fitted on ends extending through the projections.

In accordance with my invention each bearing section is provided with a molded bearing surface of durable plastic material having a very low coefficient of friction and having satisfactory wearing qualities. A suitable plastic bearing material suitable for applicant's purpose is a synthetic linear condensation polymide generally known as "nylon."

Bearings sections 2 and 3 have inner surfaces 10 and 11 respectively which are machined only to the extent necessary for providing the requisite degree of accuracy in the finished bearing. Finishing operations are rendered unnecessary by the provision for each bearing section of a nylon liner 12 which offers a smooth bearing surface 13 to a co-acting crank shaft journal. It is contemplated that the bearing liners be molded apart from the connecting rod bearing as by an injection molding process and then inserted in place in the bearing manually or in any other suitable manner (see Fig. 7). For the purpose of preventing movement of the liners circumferentially in the bearing, the bearing sections are provided with grooves 14 and 15 respectively which extend for some distance longitudinally in the bearing section and the nylon liners are provided with flared out end portions 16 which fit into the grooves and engage a horizontal face of one or the other of the bearing sections.

The plastic liners are formed with a waffle-like outer surface having generally rectangular cavitations 18 bounded by defining walls 17. Such waffle-like outer surfaces of the liners engage the inner surfaces 10 and 11 of the bearing sections and permit unevenness or roughness in these surfaces of the bearing section due to their unfinished condition to become embedded in the nylon liner without any of the liner material being squeezed out of the bearing. Embedding of unevenness or roughness in the surfaces 10 and 11 in the nylon liner material occurs at operating temperatures of about 350° F., and results in a spreading of the walls 17 in the outer surface of the nylon liner into the space afforded by the cavitations 18 to prevent a general expansion of the overall dimensions of the nylon liner itself. The liners are gripped over the entire outer surface by the roughness of the contacting surfaces 10 and 11 thereby preventing the liner material which assumes a semi-fluid condition at operating temperatures from piling up or being stretched out due to frictional forces between a co-acting journal and liner material. The cavitations 18 in addition to affording space for the expansion of the walls 17 are non-resonant cavities which also function to damp out noise which might otherwise be encountered during rotation of a co-acting shaft.

In order to facilitate molding the liners in a two-piece split mold, the cavitations 18 in the bearing liners 10 may be formed with one side 19 (Fig. 4) of the defining walls 18 at an increasing oblique angle toward the ends of the liner to permit separation of the mold parts. Preferably the liners are formed with a curvilinear outline departing from a true semi-cylindrical form to an extent such that the liners, when confined to semi-cylindrical form by the bearing sections, are maintained in tight contact with the surfaces 11 and 12 of the bearing sections by reason of the natural resiliency of the liner material.

It will now be apparent that I have provided a bearing having a plastic liner which affords a smooth bearing surface to a co-acting journal eliminating the necessity for carefully fitting babbitt liners in place or performing extensive and costly finishing operations on the bearing, and that, by reason of the specific construction of the liner, irregularities or unevenness in the contacting surfaces of the bearing sections to which the liner is fitted become embedded in the liner material to prevent the liner from being compressed or stretched by a rotating journal, and that such embedding of the said irregularities or unevenness occurs without causing the liner material to ooze out of the bearing itself.

It should be understood that this invention is not limited to specific details of construction and arrangement thereof herein illustrated, and that changes and modifications may occur to one skilled in the art without departing from the spirit of the invention.

I claim:

1. In combination, a bearing section having an unfinished inner surface, and a molded plastic liner fitted to the bearing section having an outer surface in contact with the said inner surface, the said outer surface of the liner having cavitations therein extending over substantially the entire surface into which liner material can expand and whereby roughness or unevenness in the unfinished surface can become embedded in the liner without causing liner material to be squeezed out of the bearing section.

2. In combination, a bearing section having an unfinished inner surface, and a molded nylon liner fitted to the bearing section and formed with a curvilinear outline such that the liner outer surface is forced into tight fitting contact with the inner surface of the bearing section, the said outer surface of the liner having cavitations therein extending over substantially the entire surface into which liner material can expand and whereby roughness or unevenness in the unfinished surface can become embedded in the liner without causing nylon material to be squeezed out of the bearing section.

3. A pair of complimentary detachably connected bearing sections each with an unfinished inner surface, and a molded nylon liner fitted to each of the bearing sections and formed with a curvilinear outline such that the outer surfaces of the liners are forced into tight fitting contact with the inner surfaces of the bearing sections, the said outer surfaces of the liners having cavitations therein extending over substantially the entire surfaces into which liner material can expand and whereby roughness or unevenness in the unfinished surfaces can become embedded in the liners without causing nylon material to be squeezed out of the bearing sections.

4. A liner of resilient plastic material for a bearing having an outer surface for contacting an unfinished inner bearing surface, the liner outer surface being formed with cavitations therein extending over substantially the entire surface into which liner material can expand whereby roughness or unevenness in the bearing surface can become embedded in the liner without causing liner material to be squeezed out of the bearing.

5. A liner of resilient plastic material for a semi-cylindrical bearing section, the liner having an outer surface for contacting an unfinished inner bearing surface and having a general configuration departing from a semi-cylindrical form such that the liner can be fitted to the bearing section with the liner being forced into tight fitting contact with the bearing inner surface by the resiliency thereof, the liner outer surface having cavitations formed therein extending over substantially the entire surface into which liner material can expand whereby roughness or unevenness in the bearing surface can become embedded in the liner without causing liner material to be squeezed out of the bearing.

References Cited in the file of this patent
UNITED STATES PATENTS

| | | |
|---|---|---|
| 1,555,214 | Johnson | Sept. 29, 1925 |
| 1,948,176 | Hopkins et al. | Feb. 20, 1934 |
| 2,121,277 | Albrecht et al. | June 21, 1938 |
| 2,666,677 | Miller | Jan. 19, 1954 |